United States Patent
Mayo et al.

(10) Patent No.: US 8,974,051 B2
(45) Date of Patent: Mar. 10, 2015

(54) SYSTEMS AND METHODS FOR FACILITATING MAGNETIC INK CHARACTER RECOGNITION (MICR) IMAGE FORMING USING DIGITAL OFFSET LITHOGRAPHIC PRINTING TECHNIQUES

(71) Applicant: XEROX Corporation, Norwalk, CT (US)

(72) Inventors: James D. Mayo, Mississauga (CA); Frank Ping-Hay Lee, Oakville (CA); Aurelian Valeriu Magdalinis, Aurora (CA); Marcel Breton, Mississauga (CA); Jenny Eliyahu, Maple (CA); Carolyn Moorlag, Mississauga (CA)

(73) Assignee: XEROX Corporation, Norwalk, CT (US)

( * ) Notice: Subject to any disclaimer, the term of this patent is extended or adjusted under 35 U.S.C. 154(b) by 0 days.

(21) Appl. No.: 13/907,823

(22) Filed: May 31, 2013

(65) Prior Publication Data

US 2014/0354754 A1 Dec. 4, 2014

(51) Int. Cl.
*B41J 2/435* (2006.01)
*G03D 11/00* (2006.01)
*C09D 5/23* (2006.01)

(52) U.S. Cl.
CPC .. *C09D 5/23* (2013.01); *B41J 2/435* (2013.01)
USPC .......................................... 347/100; 347/224

(58) Field of Classification Search
USPC ........ 347/91, 95, 100, 224, 225; 430/37, 105, 430/106.1–106.3, 109.4, 111.4, 111.41
See application file for complete search history.

(56) References Cited

U.S. PATENT DOCUMENTS

| 2004/0000254 | A1* | 1/2004 | McElligott et al. ........ 106/31.65 |
| 2012/0103212 | A1 | 5/2012 | Stowe et al. |
| 2012/0236065 | A1* | 9/2012 | Iftime et al. .................... 347/20 |

* cited by examiner

*Primary Examiner* — Hai C Pham
(74) *Attorney, Agent, or Firm* — Ronald E. Prass, Jr.; Prass LLP (57) ABSTRACT

A system and method are provided for producing Magnetic Ink Character Recognition (MICR) characters on image receiving medium substrates using a variable digital data offset lithographic architecture which provides for varying lithographic images between cycles of a marking device. MICR inks are provided with a solid particle magnetizable pigment components in a proportion of at least 20% by weight suspended in solution in the ink composition. MICR inks are provided with a solid particle magnetizable pigment components having particle sizes in excess of one micron suspended in solution in the ink composition. The disclosed systems and methods provide for MICR characters to be formed on an image receiving medium substrate over background images applied using other inks in a single device, and/or in a single pass of the image receiving medium substrate through the device.

19 Claims, 5 Drawing Sheets

SYSTEMS AND METHODS FOR FACILITATING MAGNETIC INK CHARACTER RECOGNITION (MICR) IMAGE FORMING USING DIGITAL OFFSET LITHOGRAPHIC PRINTING TECHNIQUES

This application is related to U.S. patent application Ser. No. 13/907,836, entitled "Systems and Methods For Delivering Aqueous Pearlescent Digital Printing Ink Compositions Using Digital Offset Lithographic Techniques" filed on May 31, 2013, the disclosure of which is hereby incorporated by reference herein in its entirety.

BACKGROUND

1. Field of Disclosed Subject Matter

This disclosure relates to systems and methods that provide an ability to produce higher quality Magnetic Ink Character Recognition (MICR) characters on substrates in a potentially more efficient manner using a proposed variable digital offset lithographic image forming architecture.

2. Related Art

Magnetic Ink Character Recognition or MICR is a character recognition technology used primarily by the banking industry to facilitate the processing and clearance of checks and other documents of value. MICR provides a scheme for high speed identification and sorting of MICR printed documents. Conventionally, MICR encoding is provided as a line of characters at the bottom of a check or other voucher-type document. The line of MICR characters typically includes information by which to identify the document, including, for example, a document type indicator, and, when the document is a check, a bank code, a bank account number, a check number, and an amount. Some type of control indicator is also generally included.

The MICR characters are generally imaged or printed separately on a document in one of a number of standardized fonts. The ink used in the printing of the MICR characters is considered a magnetic ink based on an inclusion of a magnetizable solid element in its composition. Iron oxide can be included, for example, as the magnetizable solid element.

MICR printed documents are processed mechanically and electronically through a MICR reader, which may also act as a document sorter according to individual data elements in the read information. The MICR reader reads pertinent information about the check or the other document of value including the amount, the account number, and the other information. Once read, this information is used by the sorter portion of the MICR reader to enable an electronic sort of the read documents for routing purposes. In some MICR readers, the MICR characters are passed over a magnetization portion that magnetizes the MICR ink imaged characters. The characters are then passed over a MICR read head, which may be a device similar to the playback head of a tape recorder. As each character passes over the MICR read head, it produces a unique waveform that can be easily identified by the MICR reader.

The use of MICR allows the characters to be read reliably even if they have been overprinted or obscured by other marks that may have been, for example, separately added to the checks or other documents of value in visual verification and/or other transaction processing steps. An advantage to the use of MICR in these processing and sorting schemes is that error rates experienced in the magnetic scanning of typical checks and other documents of value are significantly smaller than those experienced with automated optical reading and sorting techniques, including those that use optical character recognition.

Currently, MICR documents are typically produced in a multi-step process. The "non-changing" background and formatting images are typically printed using an offset lithographic process. Then, a separate digital printer is used to print the "changing" digital information in the MICR portion of the document. This production scheme of using separate printing steps, often with separate devices, seeks to offset disadvantages in the separate processing techniques that have conventionally made them incompatible in producing the separate images on the MICR documents.

Conventional lithographic and offset lithographic printing techniques use plates that are permanently patterned, and are, therefore, generally considered to be most useful only when printing a same image in long print runs, such as for the background images on the documents of value that are to be overprinted with MICR data that changes from substrate-to-substrate. These conventional processes are generally not considered amenable to creating and printing a new pattern from one page to the next because, according to known methods, removing and replacing of plates, including on a print cylinder, would be required in order to change images.

Based on the above, conventional lithographic techniques cannot accommodate true high speed variable data printing processes in which the images to be printed change from impression to impression, for example, as in the case of digital printing systems. This is among the reasons why the MICR portions of a document are digitally printed separately.

The lithography process is often relied upon because it provides very high quality printing at least in part due to the quality and color gamut of the inks used. Based on their consistent reuse in a process where residual ink on the plate is less of a concern, the lithographic inks tend to be much more viscous as they are loaded with greater amounts of solid components. The inks, which typically have very high color pigment content, often in a range of 20-70% by weight, tend to have comparatively very low cost compared to other inks, toners and many other types of printing or marking materials. This comparatively low cost generates a desire to use the lithographic and offset inks for printing or marking in order to take advantage of the high quality and low cost in a manageable manner. The viscous nature of these inks is not considered a disadvantage based on the lithographic ink delivery and image forming techniques. As indicated above, however, lithographic printing techniques have conventionally not been considered amenable to digital printing as that term is intended to refer to production of images on substrates that are changeable with each subsequent rendering of an image on successive substrates in an image forming process.

Although ink jet printing is amenable to high speed variable digital data image forming, the physical compositions of the jetted inks must be carefully controlled within fairly rigid parameters. Generally, jetted inks cannot be particularly viscous and/or they cannot contain particles over a certain size. Overly viscous ink compositions, or ink compositions having solid particles with larger particle sizes, will tend to easily clog the jets and introduce other issues that adversely affect image forming operations through the ink jetting process supporting the digital printing.

The preparation of jettable inks often involves extensive pulverization of the solid elements, such as the pigments or other solids included in the ink compositions, with, for example, steel shot or in a grinder (high speed media mill), in order that the solid elements are more easily suspended in the liquid thus making them easier to pass in the ink jetting process.

A difficulty arises in the compatibility of the MICR scheme with inks prepared by pulverizing the solid elements. While this is done today to support the requirements of the MICR inks being jettable, certain trade-offs are made in balancing the limitations imposed by the ink jetting digital image forming process and the preferences for composition of MICR components in the inks to effectively implement a MICR image forming scheme. In MICR, it is more preferable to have larger particles of iron oxide or other magnetizable elements in order to distinguish or read the MICR characters using a suitable magnetic image reader. To the extent that MICR can be considered a reflectance process, it is easily understood that, when a larger magnetizable surface is presented to the magnetization portion of the MICR reader, and then to the reader portion, the produced and read magnetic field will be comparatively easier to read in a manner that differentiates the MICR ink image or printed portions of the document.

A desire to form MICR characters with larger particles of magnetizable material, however, conflicts with the practical need in preparing jettable inks to pulverize the solids into as small a size as possible for those constituent elements of the jettable inks. When this concern is combined with a concern that only limited amounts of magnetizable solids can be added to the jettable ink solution without adversely affecting the viscosity of the jettable ink, it becomes clear that producing MICR inks for digital inkjet image forming of the MICR characters on a substrate requires balancing competing limitations that may keep the advantages of MICR from being fully realized and exploited.

SUMMARY OF THE DISCLOSED EMBODIMENTS

U.S. Patent Application Publication No. 2012/0103212 A1 (the 212 Publication) published May 3, 2012 and based on U.S. patent application Ser. No. 13/095,714, which is commonly assigned and the disclosure of which is incorporated by reference herein in its entirety, proposes systems and methods for providing variable digital data lithographic and offset lithographic printing or image receiving medium marking. The systems and methods disclosed in the 212 Publication are directed to improvements on various aspects of previously-attempted variable digital data imaging lithographic marking concepts based on variable patterning of fountain solutions to achieve effective truly variable digital data lithographic printing.

According to the 212 Publication, a reimageable surface is provided on an imaging member, which may be a drum, plate, belt or the like. The reimageable surface may be composed of, for example, a class of materials commonly referred to as silicones, including polydimethylsiloxane (PDMS) among others. The reimageable surface may be formed of a relatively thin layer over a mounting layer, a thickness of the relatively thin layer being selected to balance printing or marking performance, durability and manufacturability.

Figure 1:
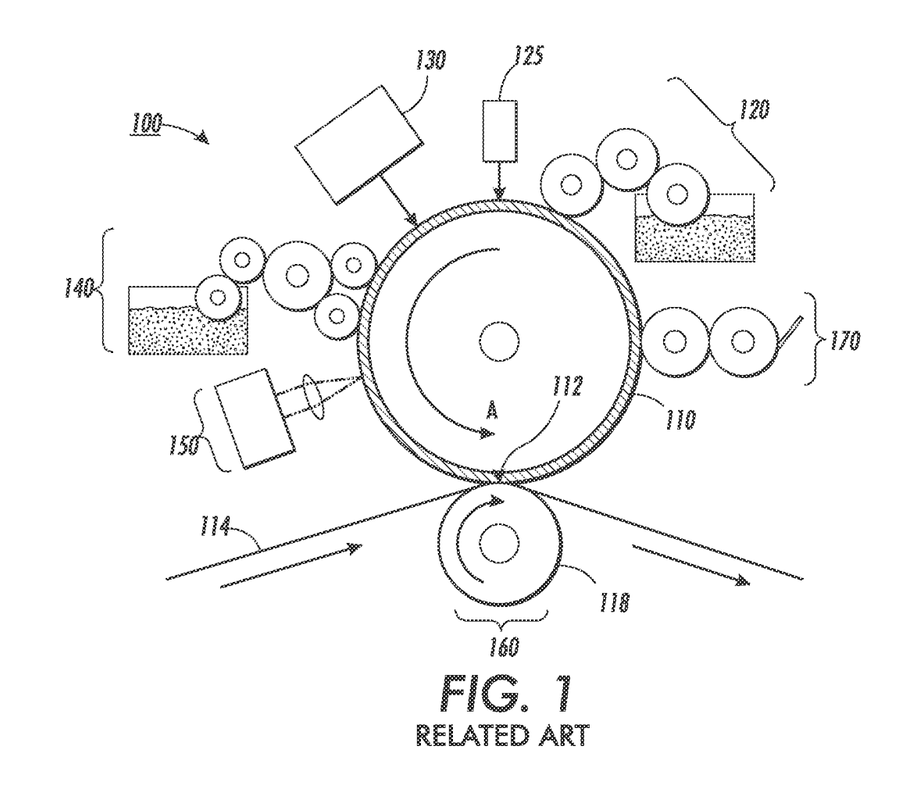
FIG. 1 illustrates a schematic representation of a proposed variable digital data lithographic printing system.

The 212 Publication describes, in requisite detail, an exemplary variable digital data lithography system 100 such as that shown, for example, in FIG. 1. A general description of the exemplary system 100 shown in FIG. 1 is provided here. Additional details regarding individual components and/or subsystems shown in the exemplary system 100 of FIG. 1 may be found in the 212 Publication.

As shown in FIG. 1, the exemplary system 100 may include an imaging member 110. The imaging member 110 in the embodiment shown in FIG. 1 is a drum, but this exemplary depiction should not be read in a manner that precludes the imaging member 110 being a plate or a belt, or of another known configuration. The imaging member 110 is used to apply an ink image to an image receiving media substrate 114 at a transfer nip 112. The transfer nip 112 is produced by an impression roller 118, as part of an image transfer mechanism 160, exerting pressure in the direction of the imaging member 110. Image receiving medium substrate 114 should not be considered to be limited to any particular composition such as, for example, paper, plastic, or composite sheet film. The exemplary system 100 may be used for producing images on a wide variety of image receiving media substrates. The 212 Publication also explains the wide latitude of marking (printing) materials that may be used, including marking materials with pigment densities greater than 10% by weight. As does the 212 Publication, this disclosure will use the term ink to refer to a broad range of printing or marking materials to include those which are commonly understood to be inks, pigments, and other materials which may be applied by the exemplary system 100 to produce an output image on the image receiving medium substrate 114.

The 212 Publication depicts and describes details of the imaging member 110 including the imaging member 110 being comprised of a reimageable surface layer formed over a structural mounting layer that may be, for example, a cylindrical core, or one or more structural layers over a cylindrical core.

The exemplary system 100 includes a fountain solution subsystem 120 generally comprising a series of rollers, which may be considered as dampening rollers or a dampening unit, for uniformly wetting the reimageable surface of the imaging member 110 with fountain solution. A purpose of the fountain solution subsystem 120 is to deliver a layer of fountain solution, generally having a uniform and controlled thickness, to the reimageable surface of the imaging member 110. The fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well to adjust the inking and transfer properties of the reimageable surface of the imaging member 110.

Once the fountain solution is metered onto the reimageable surface of the imaging member 110, a thickness of the fountain solution may be measured using a sensor 125 that may provide feedback to control the metering of the fountain solution onto the reimageable surface of the imaging member 110 by the fountain solution subsystem 120.

Once a precise and uniform amount of fountain solution is provided by the fountain solution subsystem 120 on the reimageable surface of the imaging member 110, and optical patterning subsystem 130 may be used to selectively form a latent image in the uniform fountain solution layer by imagewise patterning the fountain solution layer using, for example, laser energy. The reimageable surface of the imaging member 110 should ideally absorb most of the laser energy emitted from the optical patterning subsystem 130 close to the surface to minimize energy wasted in heating the fountain solution and to minimize lateral spreading of heat in order to maintain a high spatial resolution capability. Alternatively, an appropriate radiation sensitive component may be added to the fountain solution to aid in the absorption of the incident radiant laser energy. While the optical patterning subsystem 130 is described above as being a laser emitter, it should be understood that a variety of different systems may be used to deliver the optical energy to pattern the fountain solution.

The mechanics at work in the patterning process undertaken by the optical patterning subsystem 130 of the exemplary system 100 are described in detail with reference to FIG. 5 in the 212 Publication. Briefly, the application of optical patterning energy from the optical patterning subsystem 130 results in selective evaporation of portions of the layer of fountain solution.

Following patterning of the fountain solution layer by the optical patterning subsystem 130, the patterned layer over the reimageable surface of the imaging member 110 is presented to an inker subsystem 140. The inker subsystem 140 is used to apply a uniform layer of ink over the layer of fountain solution and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink deposited on the unformatted portions of the fountain solution will not adhere based on the hydrophobic and/or oleophobic nature of those portions.

A cohesiveness and viscosity of the ink residing in the reimageable layer of the imaging member 110 may be modified by a number of mechanisms. One such mechanism may involve the use of a rheology (complex viscoelastic modulus) control subsystem 150. The rheology control subsystem 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the reimageable surface of the imaging member 110 to a substrate of image receiving medium 114 using a transfer subsystem 160. The transfer occurs as the substrate 114 is passed through a transfer nip 112 between the imaging member 110 and an impression roller 118 such that the ink within the voids of the reimageable surface of the imaging member 110 is brought into physical contact with the substrate 114. With the adhesion of the ink having been modified by the rheology control system 150, modified adhesion of the ink causes the ink to adhere to the substrate 114 and to separate from the reimageable surface of the imaging member 110. Careful control of the temperature and pressure conditions at the transfer nip 112 may allow transfer efficiencies for the ink from the reimageable surface of the imaging member 110 to the substrate 114 to exceed 95%. While it is possible that some fountain solution may also wet substrate 114, the volume of such a fountain solution will be minimal, and will rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method using an offset roller or other device as an intermediate transfer body.

Following the transfer of the majority of the ink to the substrate 114 at the transfer nip 112, any residual ink and/or residual fountain solution must be removed from the reimageable surface of the imaging member 110 to prepare the reimageable surface to repeat the digital image forming operation. This removal is most preferably undertaken without scraping or wearing the reimageable surface of the imaging member 110. An air knife or other like non-contact device may be employed to remove residual fountain solution. It is anticipated, however, that some amount of ink residue may remain. Removal of such remaining ink residue may be accomplished through use of some form of cleaning subsystem 170. The 212 Publication describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the fountain solution of the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade or other like device and collected as waste.

The 212 Publication details other mechanisms by which cleaning of the reimageable surface of the imaging member 110 may be facilitated. Regardless of the cleaning mechanism, however, cleaning of the residual ink and fountain solution from the reimageable surface of the imaging member 110 is essential to preventing ghosting in subsequent image forming operations as the images change. Once cleaned, the reimageable surface of the imaging member 110 is again presented to the fountain solution subsystem 120 by which a fresh layer of fountain solution is supplied to the reimageable surface of the imaging member 110, and the process is repeated.

According to the above proposed structure, variable digital data lithography has attracted attention in producing truly variable digital images in a lithographic image forming system. The above-described architecture combines the functions of the imaging plate and potentially a transfer blanket into a single imaging member 110.

It would be advantageous to adapt the above-described variable digital data lithographic printing system to support effective MICR image forming on a substrate potentially in a single pass of the substrate through an image forming system.

Exemplary embodiments of the systems and methods according to this disclosure may take advantage of the proposed variable digital data lithographic printing architecture to provide, at once, a speed of offset printing and the digital capability of ink jet or xerographic printing for MICR character production on individual substrates.

Exemplary embodiments may accommodate the production of MICR characters on a substrate in a manner that leads to better MICR character discrimination by allowing wider latitude with respect to the particle size and composition of the magnetizable material components of the MICR inks to optimize the ink compositions in support of MICR. Larger volumes of comparatively larger particle sized elements with regard to the magnetizable materials may be accommodated without concern for the limitations imposed in conventional digital image forming methods, including ink jetting of the MICR inks.

Exemplary embodiments may accommodate the production of MICR characters on the substrate in a manner that the cured MICR ink characters would be sufficiently robust to be more easily read as well as being better able to withstand the friction generated in the automated MICR readers through which the MICR documents are processed.

Exemplary embodiments may provide a system in which MICR characters may be imaged on a substrate surface with other imaging accomplished by the variable digital data lithographic printing system to print a finished document, including a check or other document of value in a single pass and/or using a single print source. This capacity may significantly improve the efficiency by which MICR documents may be produced.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods that provide an ability to produce higher quality MICR characters on substrates in a more efficient manner using a proposed variable digital data offset lithographic architecture will be described, in detail, with reference to the following drawings, in which.

DETAILED DESCRIPTION OF THE DISCLOSED EMBODIMENTS

The systems and methods that provide an ability to produce higher quality MICR characters on substrates in a more efficient manner using a proposed variable digital data offset lithographic architecture will generally refer to this specific utility or function for those systems and methods. Exemplary embodiments described and depicted in this disclosure should not be interpreted as being specifically limited to any particular configuration of the described image forming elements, or as being specifically directed to any particular intended use for those elements. Any advantageous incorporation of a MICR character production capability in a variable digital data lithographic printing system that facilitates high quality output lithographic images, particularly as may be produced in a single pass or in a single device, is contemplated as being included in this disclosure.

Specific reference to, for example, lithographic printing techniques, and to the proposed variable digital data lithographic printing device should not be considered as being limited to any particular configuration of the techniques or devices, as described. The terms "image forming device," "offset lithographic printing device/system," "offset lithographic marking device/system" and the like, as referenced throughout this disclosure are intended to refer globally to a class of devices and systems that carry out what are generally understood as lithographic marking functions as those functions would be familiar to those of skill in the art. Additionally, while references will be made to individual MICR ink compositions and the like, these references, and described compositions of constituent elements too, are intended to be exemplary only and not limiting to the disclosed subject matter.

Exemplary MICR inks have been tested for use in the proposed variable digital data offset lithographic architecture, which has been referred to as a "Digital Advanced Lithographic Imaging" or DALI system. In these exemplary MICR inks, for example, cobalt ferrite ($CoFe_2O_4$) was selected as the pigment, owing to its favorable magnetic characteristics Inks having 40 to 50 percent by weight pigment were prepared using a 3-roll mill Inks were then printed using a drawdown coating apparatus for MICR evaluation, and prints were demonstrated with a DALI test plate. While MICR inks have been printed digitally by ink jet, MICR inks printed digitally by variable digital data offset methods offer expanded options for the use of higher percentages by weight of larger particles leading to stronger magnetic signals, and lower costs to customers. Based on these advantages, the next generation digital offset imaging or DALI products may advantageously include MICR as an option to satisfy market requirements. It is also envisioned that MICR ink formulations may find application in conventional offset printing or hybrid conventional offset/digital offset image forming systems as other advances may be made in variable digital data lithographic printing.

As described above, the proposed digital offset printing or DALI process may involve the transfer of a pigmented UV-curable ink onto a fluoro-silicone printing plate, which has been partially coated with a fountain solution as a release agent. The ink is then optionally partially cured using UV light and transferred from the plate to the substrate, which may be generally unrestricted in its composition to include being one or more of a paper, a plastic or a metal. Once transfer is complete, the deposited ink images on the substrate may be exposed again to UV light for final curing of the deposited image on the substrate.

In order to meet the requirements of the digital offset printing or DALI process, the ink may possess many desirable physical and chemical properties. The ink must be compatible with materials with which it is in contact, including the printing plate, the fountain solution and the myriad image receiving medium substrates. The ink must also meet all functional requirements of the digital offset printing or DALI subsystems, including wetting and transfer properties.

Inks formulated for the digital offset printing or DALI process are different in many ways from other conventional inks used in other applications, including conventional pigmented solid inks and other UV-curable gel inks Digital offset printing or DALI inks generally contain much higher (up to 10 times) pigment loading and therefore have higher viscosities at room temperature. This higher pigment loading provides an advantage of increased hiding power on printed images. In consideration of MICR character production and the deposition of other MICR images, the higher pigment loading allows for increased magnetic character in the inks with the inclusion of larger percentage quantities of magnetizable solids in the ink compositions. Another advantage of the digital offset printing or DALI inks is the limited requirement for any particle size reduction to which the solid constituent components are exposed during processing. Unlike pigmented jettable inks, which are subjected to high energy impact milling such as through attrition or media mills, offset inks are typically processed using a 3-roll mill, in which particle size is controlled by a number of passes, composition of the ink, and processing parameters. Compared with the jettable inks, larger particles (micron-sized and more) in the inks may be tolerated for digital offset printing or DALI processes. The latitude in the inclusion of larger particles may support or enable higher magnetizability, and improved performance in a MICR reader. Furthermore, film thicknesses or pile heights for the deposited ink images may be easily controlled using the digital offset printing or DALI architectures by modifying the image area of the printing plate. This characteristic may additionally be effectively used to optimize the magnetic characteristics of the MICR characters in the final print.

The disclosed embodiments propose ink formulations that have been developed to meet the printing requirements for a digital offset or DALI printer. In embodiments, MICR pigments are incorporated into the inks such that they meet these requirements, namely wetting and release properties from the proposed offset plate and compatibility with the non-aqueous fountain solutions usable with these image forming processes.

In experiments, a number of MICR-based DALI inks were successfully prepared using both commercially available $CoFe_2O_4$ nano-MICR particles and conventional $Fe_3O_4$ MICR particles. Viscosities and physical characteristics were measured as being typical of existing DALI inks Printing and measurement of the magnetic characteristics of a print were effectively demonstrated.

For demonstration purposes, the following ink components were selected: a MICR pigment, $CoFe_2O_4$, available from MTI Corporation®; curable functional acrylate monomers available from Sartomers® (CN 293, CN294E, CN259, CN454); Solsperse® 39,000 dispersant available from Lubrizol®; a thermal stabilizer, Irgastab® UV10 available from BASF®; optionally aerosol 200 vs available from Degussa Canada Ltd®; and a photoinitiator system composed of Irgacure® 819, Bis(2,4,6-trimethylbenzoyl)-phenylphosphineoxide) and Irgacure® 184, 1-Hydroxy-cyclohexyl-phenylketone. The photoinitiator system may contain optionally Irgacure® 379, 2-Dimethylamino-2-(4-methyl-benzyl)-1-(4-morpholin-4-yl-phenyl)-butan-1-one, and Esacure Kip® 150, Oligo [2-hydroxy-2-methyl-1-[4-(1-methylvinyl)phenyl]propanone] respectively available from BASF®, BASF®, and Lamberti®. Other optional components or additives may include: 1) polyester oligomers selected from Sartomer® (CN2255), a high viscosity polyester acrylate oligomer with a glass transition T of −13° C. and CN2256 also a polyester acrylate oligomer with viscosity of 11,000 cps at 60° C. and a glass transition T of −22° C.; 2) a hindered amine light stabilizer such as TINUVIN®292; 3) a levelling agent such as Byk 3500, a polyether modified acryl functional polydimethylsiloxane; and 4) a defoamer such as Additol VXL 4951 available from Cytek®. With reference to these and the other experimental compositions and composition components described herein, those of skill in the art will recognize that many other combinations of constituent elements may be substituted without departing from the disclosed concepts for proper ink compositions.

In experiments, ink processing was carried out in four stages. Monomers and dispersants were blended in a stainless steel beaker with an anchor impeller at 80° C. for 60 min. Pigments were added and wetting was then conducted in a stainless steel beaker with an anchor impeller at 80° C. for 30 min, followed by homogenization with a high-shear impeller at 5200 rpm. Milling was conducted with an Erweka® Model AR400 3-roll mill at 80° C. (1st pass), and 30° C. (passes 2-4). It is understood that the number of passes for a production ink may be dependent on target rheology and a desired particle size. The product ink was then discharged into brown glass bottles.

Figure 2:
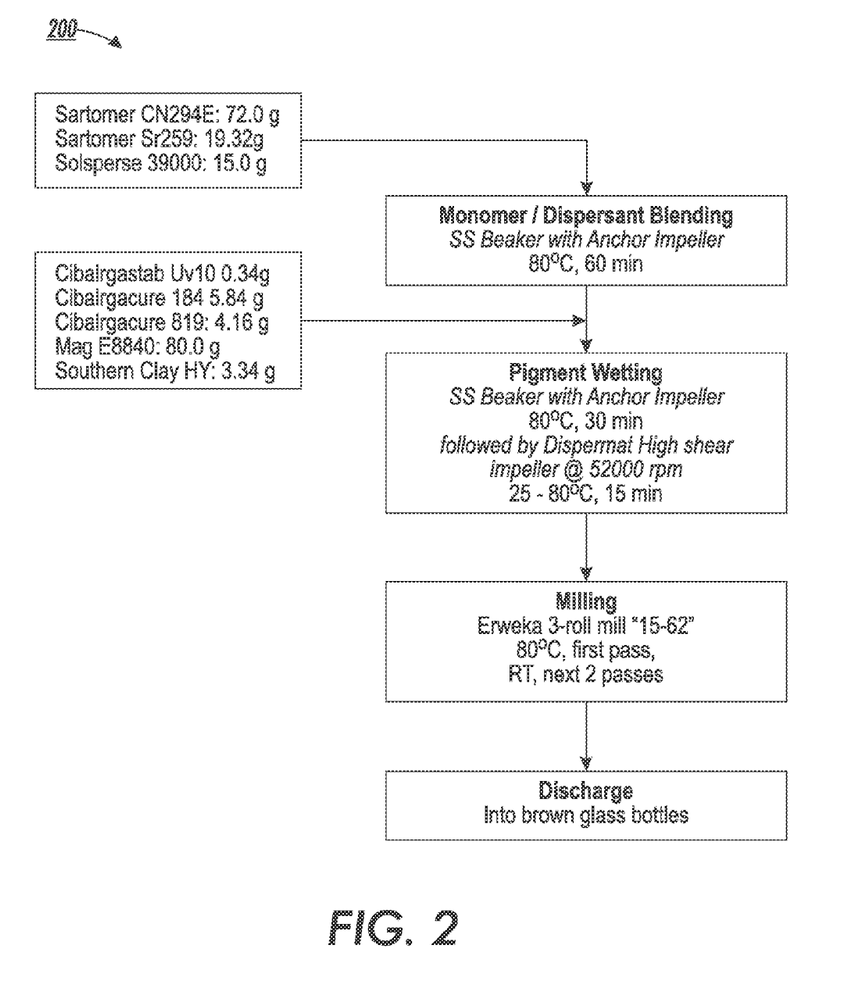
FIG. 2 illustrates an exemplary process flow diagram for the exemplary MICR compositions that have been experimented with as described in this disclosure followed by Dispermat High Shear mixing @ 5200 rpm in a Erweka® Model AR400 3-roll mill.

FIG. 2 illustrates an exemplary process flow diagram 200 for the EXAMPLE 3 experiment as described above and as shown in Table 1 below.

TABLE 1

| | Example 1 | | Example 2 | Example 3 |
|---|---|---|---|---|
| Chemical | Wt. % | Quantity (g) | Wt. % | wt % |
| MICR CoFe2O4 | 50 | 100 | 48 | |
| Mag E8840 | | | | 40.00 |
| Sartomer CN293 | 2.04 | 4.08 | | |
| Sartomer CN294E | 0 | 0 | 30.1 | 36 |
| Sartomer SR259 | 22.54 | 45.08 | 7.56 | 9.66 |
| Sartomer SR454 | 10.25 | 20.5 | | |
| Lubrizol Solsperse 39000 | 7.5 | 15 | 7.5 | 7.5 |
| Southern Clay HY | 1.67 | 3.34 | 1.67 | 1.67 |
| Ciba Irgacure 184 | 2.92 | 5.84 | 2.92 | 2.92 |
| Ciba Irgacure 819 | 2.08 | 4.16 | 2.08 | 2.08 |
| Ciba Irgastab UV10 | 0.17 | 0.34 | 0.17 | 0.17 |
| BYK3500 | 0.83 | 1.66 | | |
| Total | 100.00 | 200.00 | 100.00 | 100.00 |
| Viscosity (25° C.) in cps | | | | |
| Zero Shear Viscosity | 1.95E+07 | | 6.06E+07 | 9.88E+07 |
| Viscosity (5 1/s) | 4.45E+04 | | 2.24E+05 | 2.58E+05 |
| Viscosity (50 1/s) | 1.22E+04 | | 1.18E+05 | 7.18E+04 |
| Shear Thinning Index (50/5 1/s) | 0.27 | | 0.53 | 0.30 |

Rheology data (as included in Table 1 above) was obtained on all ink formulations using an ARES® G2 controlled strain rheometer with a Peltier temperature control system for rapid heating/cooling, and a geometry of a 25 mm parallel plate.

A printing demonstration was undertaken by hand testing using test DALI fluoro-silicone plates as the imaging plates and the EXAMPLE 3 formulation shown above in Table 1. EXAMPLE 3 ink was applied by hand roller to fluoro-silicone-over-silicone test DALI plates and was observed to wet the plates. Precisely, application of fountain solution to the plates, followed by rolling ink over the plates with a rubber roller was undertaken and then transfer from the plates to paper was effected. The demonstration resulted in good background performance where the EXAMPLE 3 ink was not present in the background area. Some background was evident in areas of thinner fountain solution, but was improved with optimization of formulation and physical properties. Importantly, the EXAMPLE 3 ink was fully transferred with three passes and this was evaluated as acceptable transfer performance for the DALI process.

Testing of the magnetic signal of the EXAMPLE 3 ink was carried out by first preparing a K-Proof (even ink layer) using the EXAMPLE 3 ink. The magnetic signal reading of the test document (137%) obtained with an EASY CHECK® MICR TESTER matched or exceeded readings obtained for conventionally-produced MICR checks (recorded values of 137% and 120%). These results were considered to confirm that the prepared MICR ink is as magnetic as commercial ink used to conventionally print bank checks in a digital ink jetting process.

It should be noted that MICR inks can effectively accommodate larger ink particles also because the printing of MICR characters according to the one or more standardized fonts, in single colors, does not require particularly high resolution such as may be required in the formation of intricate multicolor images on a substrate. Particle sizes for the MICR pigment particles present in the EXAMPLE 3 ink of Table 1 were in a range of 1-10 microns.

MICR digital offset inks suitable for DALI architectures and subsystems were produced using as mainline curable components many of the reactive monomers or oligomers that have been shown to be compatible with the DALI digital offset printing systems. These inks have a number of advantages: suitability for DALI printing processes and systems; compatibility with fountain solution and plate materials used for DALI printing processes and systems; and improved magnetic characteristics based on relatively higher MICR pigment loading and larger particle sizes, e.g., through enabling digital printing of micron plus particle sized MICR inks.

Figure 3:
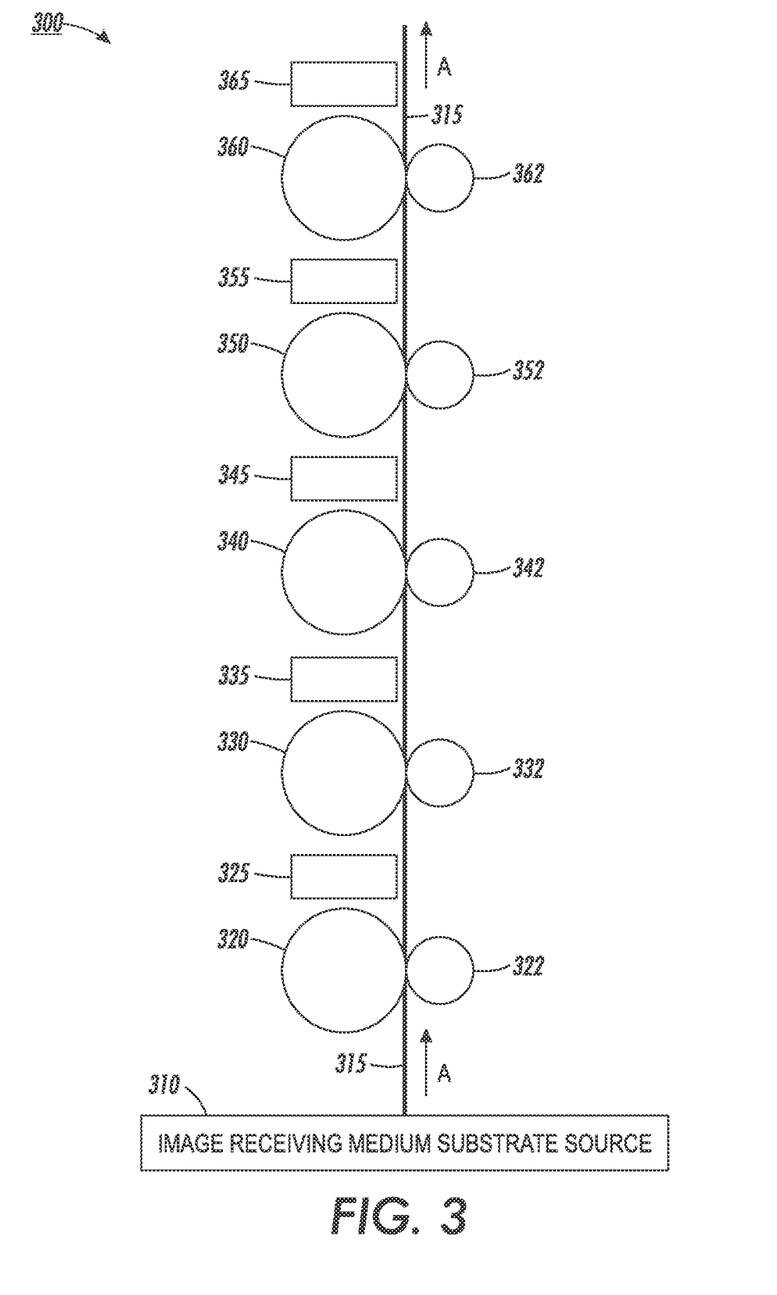
FIG. 3 illustrates a schematic representation of an exemplary embodiment of an image forming device that may be used to implement single pass image forming to include MICR character image forming according to this disclosure.

FIG. 3 illustrates a schematic representation of an exemplary embodiment of an image forming device 300 for implementing MICR character image forming according to this disclosure. As shown in FIG. 3, individual image receiving media substrates may be provided in an image receiving medium substrate source 310. The individual image receiving media substrates may be sequentially passed along an image receiving medium transport path 315 in direction A.

The individual image receiving media substrates may be passed from multiple transfer nips formed between inked imaging rollers 320, 330, 340, 350 and the opposing rollers 322, 332, 342, 352 in order to deposit multiple colors of inks on the individual image receiving media substrates. The inked imaging rollers 320, 330, 340, 350 may be conventional lithographic image transfer rollers or may otherwise be image transfer rollers as part of a variable digital data offset lithographic system as shown, for example, in FIG. 1. As each colored ink may be deposited on an individual image receiving medium substrate as that substrate proceeds along the image receiving medium transport path 315, each deposited colored ink may be partially cured by an intermediary partial cure device 325, 335, 345, 355.

Once a background image is deposited, and potentially partially cured, on an individual image receiving medium substrate, the individual image receiving medium substrate may continue along the image receiving medium transport path 315 to a fifth inked imaging roller 360 for transferring a MICR inked image onto the image receiving medium substrate at a MICR imaging nip formed between the fifth inked imaging roller 360 and its own opposing roller 362 prior to passing the multi-color imaged and MICR imaged image receiving medium substrate to an output tray (not shown). In embodiments according to this disclosure, the fifth inked imaging roller 360 for transferring the MICR ink image onto the image receiving medium substrate may preferably be an inked imaging roller associated with a variable digital data offset lithographic system or device.

Figure 4:
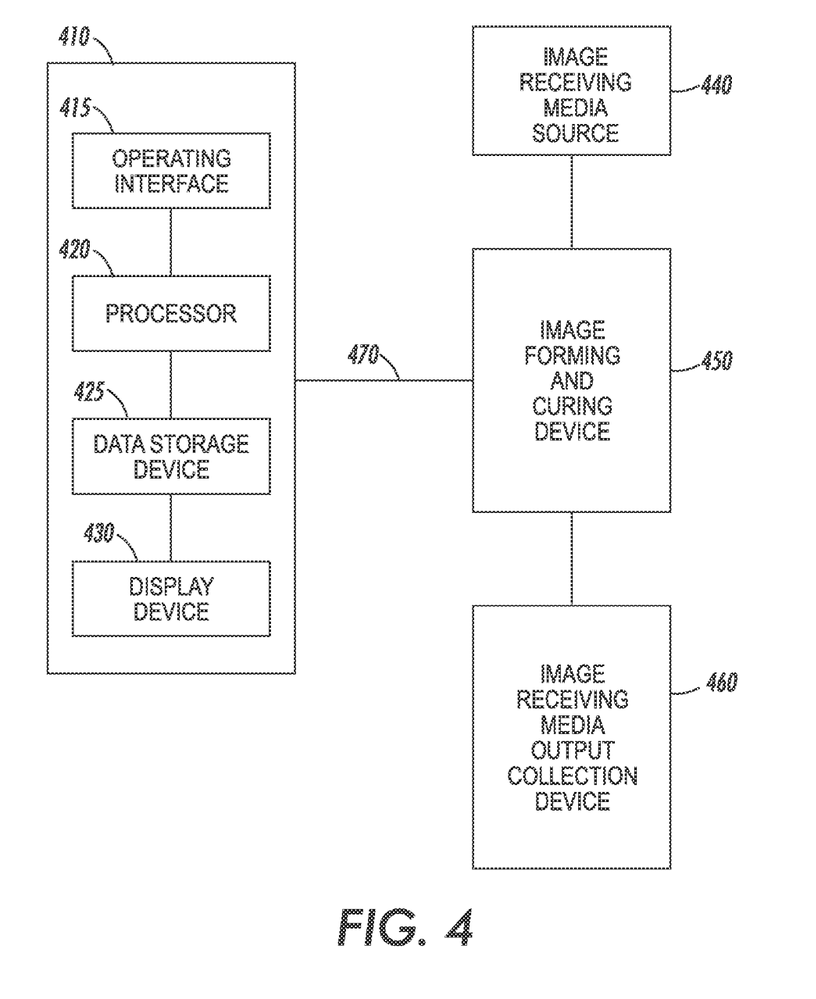
FIG. 4 illustrates a block diagram of an exemplary embodiment of an image forming system implementing the MICR character image forming according to this disclosure.

FIG. 4 illustrates a block diagram of an exemplary embodiment of an image forming system 400 for implementing MICR character image forming according to this disclosure.

The exemplary image forming system 400 may include an exemplary control system 410. All or some of the components of the exemplary control system 410 may be included as integral components of the exemplary image forming system 400. Otherwise, certain of the components of the exemplary control system 410 for undertaking processing and control functions for the exemplary image forming system 400 may be housed in, for example, a separate computing device that may be associated with the exemplary image forming system 400, and connected, for example, to the exemplary image forming system 400 via a communication link 470, which may be constituted of a wired or wireless data connection between the exemplary control system 410 and other components of the exemplary image forming system 400.

Generally, in the image forming system 400, individual image receiving media substrates (sheets) may be provided in an image receiving media source 440, which may include, for example, an input image media source tray. The image receiving medium substrates may be transported to an image forming and curing device 450, which may be constituted of a digital offset image forming device, where the images are formed by depositing image marking material on the image receiving media substrates. The image receiving media substrates with the images formed, fused and fixed thereon, including MICR images according to the disclosed concepts being formed, fused and fixed thereon, the finished image receiving media substrates may be transported to, and deposited in, an image receiving media output collection unit 460.

The exemplary control system 410 may include an operating interface 415 by which a user may communicate with the exemplary control system 410 for directing image forming operations on the image receiving media substrates in the image forming system 400. The operating interface 415 may be a locally accessible user interface associated with the image forming system 400. The operating interface 415 may be configured as one or more conventional mechanisms common to control devices and/or computing devices that may permit a user to input information to the exemplary control system 410. The operating interface 415 may include, for example, a conventional keyboard, a touchscreen with "soft" buttons or with various components for use with a compatible stylus, a microphone by which a user may provide oral commands to the exemplary control system 410 to be "translated" by a voice recognition program, or other like device by which a user may communicate specific operating instructions to the exemplary control system 410. The operating interface 415 may be a part of a function of a graphical user interface (GUI) mounted on, integral to, or associated with, the image forming system 400 with which the exemplary control system 410 is associated.

The exemplary control system 410 may include one or more local processors 420 for individually operating the exemplary control system 410 and for carrying out operating functions in the image forming system 400. Processor(s) 420 may include at least one conventional processor or microprocessor that interprets and executes instructions to direct specific functioning of the exemplary control system 410 and image forming system 400.

The exemplary control system 410 may include one or more data storage devices 425. Such data storage device(s) 425 may be used to store data or operating programs to be used by the exemplary control system 410, and specifically the processor(s) 420. Data storage device(s) 425 may be used to store information regarding individual operating characteristics of the image forming and curing device 450 to, for example control image forming and MICR character production in the image forming and curing device 450. These stored schemes may control all operations of the image forming system 400. The data storage device(s) 425 may include a random access memory (RAM) or another type of dynamic storage device that is capable of storing updatable database information, and for separately storing instructions for execution of system operations by, for example, processor(s) 420. Data storage device(s) 425 may also include a read-only memory (ROM), which may include a conventional ROM device or another type of static storage device that stores static information and instructions for processor(s) 420. Further, the data storage device(s) 425 may be integral to the exemplary control system 410, or may be provided external to, and in wired or wireless communication with, the exemplary control system 410.

The exemplary control system 410 may include at least one data display device 430, which may be configured as one or more conventional mechanisms that output information to a user, including, but not limited to, a display screen on a GUI of the image forming system 400 with which the exemplary control system 410 may be associated. The data display device 430 may be used to indicate to a user a status of an image forming operation in the image forming system 400, or specific operation of the image forming and curing device 450 for executing imaging and MICR character forming operations.

All of the various components of the exemplary control system 410, as depicted in FIG. 4, may be connected internally, and to the image forming and curing device 450, by one or more data/control busses. These data/control busses may provide wired or wireless communication between the various components of the exemplary control system 410, whether all of those components are housed integrally in, or are otherwise external and connected to, other components of the image forming system 400 with which the exemplary control system 410 may be associated.

It should be appreciated that, although depicted in FIG. 4 as an essentially integral unit, the various disclosed elements of the exemplary control system 410 may be arranged in any combination of sub-systems as individual components or combinations of components, integral to a single unit, or external to, and in wired or wireless communication with, the single unit of the exemplary control system 410. In other words, no specific configuration as an integral unit or as a support unit is to be implied by the depiction in FIG. 4. Further, although depicted as individual units for ease of understanding of the details provided in this disclosure regarding the exemplary control system 410, it should be understood that the described functions of any of the individually-depicted components may be undertaken, for example, by one or more processors 420 connected to, and in communication with, one or more data storage device(s) 430, all of which support operations in the image forming system 400.

Figure 5:
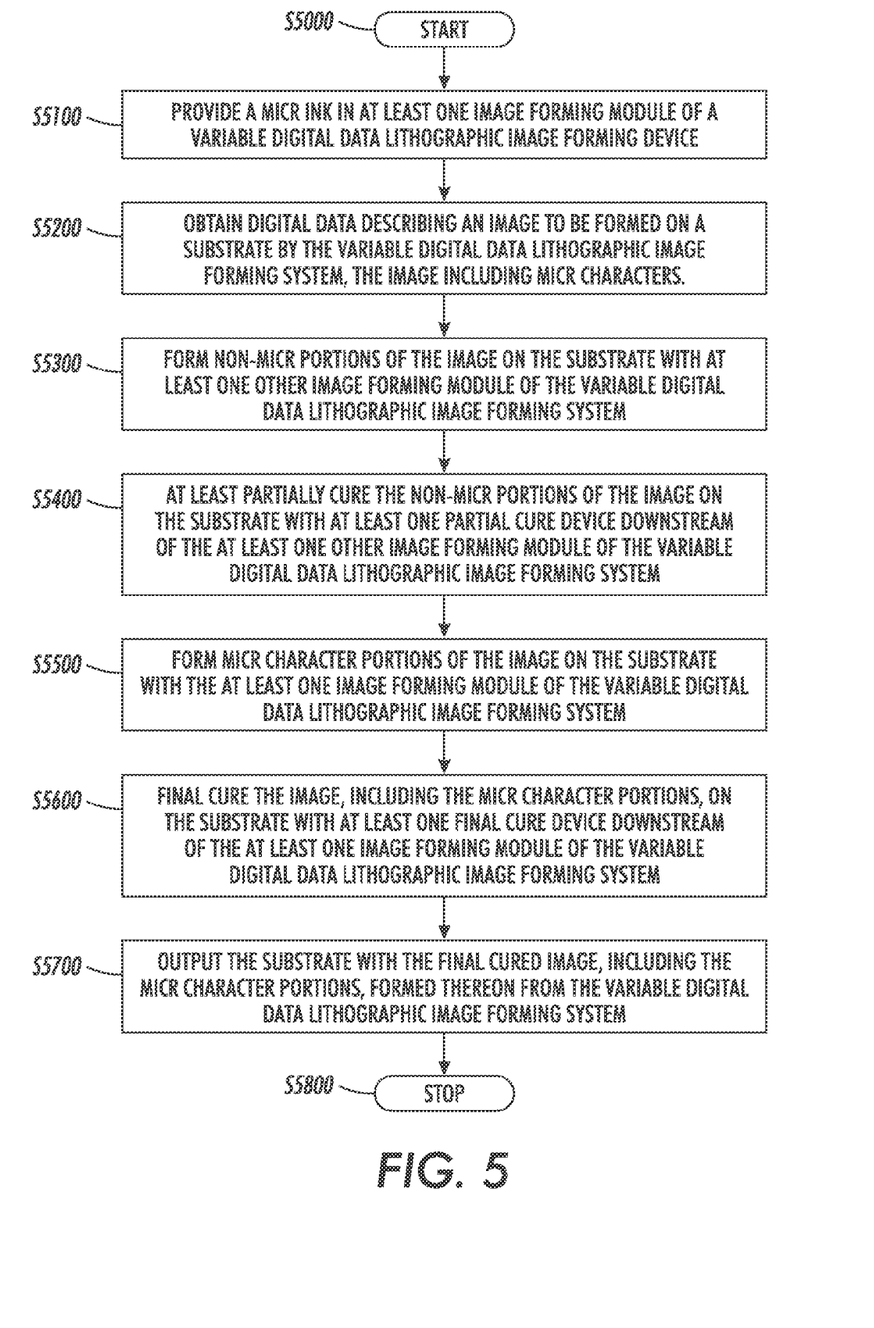
FIG. 5 illustrates a flowchart of an exemplary method for implementing variable data lithographic printing for MICR characters in a proposed variable data lithographic printing system according to this disclosure.

The disclosed embodiments may include an exemplary method for implementing variable data lithographic printing for MICR characters in a proposed variable data lithographic printing system. FIG. 5 illustrates a flowchart of such an exemplary method. As shown in FIG. 5, operation of the method commences at Step S5000 and proceeds to Step S5100.

In Step S5100, MICR ink may be provided in at least one image forming module level variable digital data lithographic image forming system. Based on the fact that MICR characters are likely to change from substrate to substrate, the at least one image forming module of the variable digital data lithographic image forming system to which the MICR ink is provided and will comprise a variable data lithography system such as that shown, for example, in FIG. 1. Operation of the method proceeds to Step S5200.

In Step S5200, digital data describing an image to be formed on a substrate by the variable digital data lithographic image forming system may be obtained. The digital data may be obtained, for example, by user input of information via some form of operating interface, or may be recovered from a storage device based on some user input. In other words, sources of the digital data describing the image to be formed on the substrate may be obtained according to known methods and provided to the variable digital data lithographic image forming system via wired or wireless communications. The digital data describing the image to be formed on the substrate may include information regarding MICR characters to be produced as part of the image on the substrate, overlying other image elements, or in a separate portion of the substrate from other image elements. Operation of the method proceeds to Step S5300.

In Step S5300, background portions or other non-MICR portions of the image may be formed on the substrate according to the digital data described in the image to be formed on the substrate. These portions of the image data may be formed by image forming modules that are not the image forming module to which the MICR ink is provided. These "other" image forming modules may be variable digital data lithographic image forming modules, or may be conventional lithographic image forming modules including, for example, fixed plates on imaging drum. It is envisioned that, although the variable digital data lithography system shown in exemplary manner in FIG. 1 is generally depicted and described as a single color image forming module, advances in the variable data lithography system may provide for producing multi-color images using a single reimageable surface on a single imaging member as shown. In such instances, separate cycles of the imaging member may introduce marking materials of differing colors. In such an instance, a last cycle of, for example, the multicolor imaging member may apply the MICR character elements in the manner described below. Operation of the method proceeds to Step S5400.

In Step S5400, some or each of the non-MICR portions of the image applied to the substrate as a single color, or in multiple colors, may be partially cured in a manner that fixes the non-MICR image portions on the substrate. This partial curing may prove particularly advantageous in a variable digital data lithographic image forming system in which the substrate is subjected to multiple image transfers at multiple image forming nips. Partial curing of the portions of the image transferred to the substrate at previous image forming nips will reduce, or substantially eliminate, a potential for back transfer of the already deposited imaging elements at subsequent image forming nips. Operation of the method proceeds to Step S5500.

In Step S5500, MICR portions of the image may be formed on the substrate with at least one image forming module to which MICR ink has been provided. As indicated above, at least the one image forming module that is used to form the MICR character portions of the image on the substrate will comprise a variable digital data lithography system such as that shown, in exemplary manner, in FIG. 1. Operation of the method proceeds to Step S5600.

In Step S5600, the total image, including the MICR character portions may be ultimately cured and/or fused on the substrate with at least one final curing device downstream of the at least one image forming module of the variable digital data lithographic image forming system that forms the MICR character portions of the image on the substrate. Operation the method proceeds to Step S5700.

In Step S5700, the substrate, with the final cured image, including the MICR character portions, formed there on may be output from the variable digital data lithographic image forming system. Operation the method proceeds to Step S5800, where operation of the method ceases.

The above-described exemplary systems and methods may reference certain conventional lithographic image forming device components to provide a brief, background description of image forming means which may be modified to carry out variable digital data lithographic image forming for images which include, at least in part, MICR inks, in a system using a unique image forming technique. No particular limitation to a specific configuration of the variable digital data lithography portions or modules of an overall variable digital data lithographic image forming system is to be construed based on the description of the exemplary elements as depicted and described.

Those skilled in the art will appreciate that other embodiments of the disclosed subject matter may be practiced with many types of image forming elements common to lithographic systems in many different configurations. As mentioned briefly above, multiple single color/single ink modules may be provided to form multicolor images including MICR characters or a single multiple color/multiple ink module may be provided to form the multicolor images including MICR characters. In other words, no particular limiting configuration is to be implied from the above description and the accompanying drawings.

The exemplary depicted sequence of executable instructions represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 5, and the accompanying description, except where a particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

As indicated in detail above, while the exemplary compositions of the experimental MICR inks shown in Table 1 provide examples of appropriate compositions of individual materials that may be used to comprise the disclosed MICR inks, it should be understood that one of skill in the art may deviate from the experimental compositions in order to optimize the inks used to form the MICR characters on specified substrates using the systems and methods according to this disclosure. In other words, although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. An ink composition for use in magnetic ink character recognition, comprising:
    a solid particle magnetizable pigment component in a proportion of at least 40% by weight suspended in solution in the ink composition; and
    the solution comprising two or more of
        at least one curable monomer;
        at least one dispersant;
        a thermal stabilizer; and
        a photo initiator system.

2. The ink composition of claim 1, the solid particle magnetizable pigment component having an average particle size of greater than 1 micron.

3. The ink composition of claim 1, the solid particle magnetizable pigment component having an average particle size of greater than 5 microns.

4. The ink composition of claim 1, the solid particle magnetizable pigment component being an iron oxide.

5. The ink composition of claim 1, the solid particle magnetizable pigment component being cobalt ferrite ($CoFe_2O_4$).

6. The ink composition of claim 1, wherein the at least one curable monomer is a functional acrylate monomer.

7. The ink composition of claim 1, the solution further comprising at least one of a polyester oligomer and a light stabilizer.

8. A system for producing magnetic ink character recognition characters on a substrate, comprising:
    at least one variable data lithography device, the at least one variable data lithography device including:
        an imaging member with a reimageable surface supporting digital data reimaging for lithographic image transfer to an image receiving medium substrate;
        a wetting solution source that deposits a layer of wetting solution on the reimageable surface;
        an optical patterning subsystem that patterns a latent image according to received digital data in the layer of wetting solution through selective evaporation of the layer of wetting solution;
        a magnetic ink character recognition ink source that applies magnetic ink character recognition ink to the reimageable surface to produce an inked image from the patterned latent image for transfer of the magnetic ink character recognition characters to the image receiving medium; substrate, the magnetic ink character recognition ink comprising a solid particle magnetizable pigment component in a proportion of at least 40% by weight suspended in solution in the ink composition, the solution comprising two or more of (1) at least one curable monomer, (2) at least one dispersant, (3) a thermal stabilizer, and (4) a photo initiator system,
    at least one background imaging ink source that provides at least one color ink for separate image formation on the image receiving medium substrate; and
    a curing device that cures image elements on the image receiving medium substrate,
    the image receiving medium substrate (1) being marked with a background image using ink from the at least one background image ink source, (2) being marked with the magnetic ink character recognition characters from the at least one variable data lithography device after being marked with the background image, and (3) having the background image and the magnetic ink character recognition characters cured on the image receiving medium substrate by the curing device to produce a magnetic ink character recognition document.

9. The system of claim 8, the at least one background imaging ink source being included as a module in the at least one variable data lithography device and applying the at least one color ink to the reimageable surface to produce a background inked image from the patterned latent image on at least one imaging cycle in which the at least one variable data lithography device transfers the background image to the image receiving medium substrate prior to a separate cycle of the at least one variable data lithography device in which the magnetic ink character recognition characters are formed on the image receiving medium substrate.

10. The system of claim 9, further comprising an intermediate curing device that at least partially cures the background image on the image receiving medium substrate prior to forming the magnetic ink character recognition characters on the image receiving medium substrate.

11. The system of claim 8, the at least one background imaging ink source being a component of a separate marking module, the separate marking module applying the at least one color ink to the reimageable surface to produce a background inked image on the image receiving medium substrate prior to the at least one variable data lithography device forming the magnetic ink character recognition characters on the image receiving medium substrate.

12. The system of claim 11, the separate marking module comprising a conventional lithographic marking device.

13. The system of claim 11, the separate marking module comprising another at least one variable data lithography device.

14. The system of claim 11, further comprising an intermediate curing device positioned between the separate marking module and the at least one variable data lithography device in a process direction that at least partially cures the background image on the image receiving medium substrate prior to forming the magnetic ink character recognition characters on the image receiving medium substrate.

15. A method for producing magnetic ink character recognition characters on a substrate, comprising:
   applying at least one background image to an image receiving medium substrate using at least one color ink from a first ink source for background image formation on the image receiving medium substrate in a single image forming device;
   at least partially curing the background image on the image receiving medium substrate;
   applying magnetic ink character recognition characters to the image receiving medium substrate with at least one variable data lithography device, the at least one variable data lithography device including:
      an imaging member with a reimageable surface supporting digital data reimaging for lithographic image transfer to an image receiving medium substrate;
      a wetting solution source that deposits a layer of wetting solution on the reimageable surface;
      an optical patterning subsystem that patterns a latent image according to received digital data in the layer of wetting solution through selective evaporation of the layer of wetting solution;
   a magnetic ink character recognition ink source that applies magnetic ink character recognition ink to the reimageable surface to produce an inked image from the patterned latent image for transfer of the magnetic ink character recognition characters to the image receiving medium substrate on which the background image is formed, the magnetic ink character recognition ink comprising a solid particle magnetizable pigment component in a proportion of at least 40% by weight suspended in solution in the ink composition, the solution comprising two or more of (1) at least one curable monomer, (2) at least one dispersant, (3) a thermal stabilizer, and (4) a photo initiator system; and
   final curing the background image and the magnetic ink character recognition characters as image elements on the image receiving medium substrate.

16. The method of claim 15, the first ink source being included as a module in the at least one variable data lithography device and applying the at least one color ink to the reimageable surface to produce a background inked image from the patterned latent image on at least one imaging cycle in which the at least one variable data lithography device transfers the background image to the image receiving medium substrate prior to a separate cycle of the at least one variable data lithography device in which the magnetic ink character recognition characters are applied to the image receiving medium substrate using the magnetic ink character recognition ink from the second ink source.

17. The method of claim 15, the first ink source being a component of a separate marking module, the separate marking module applying the at least one color ink to the reimageable surface to produce a background inked image on the image receiving medium substrate prior to the at least one variable data lithography device applying the magnetic ink character recognition characters to the image receiving medium substrate using the magnetic ink character recognition ink from the second ink source.

18. The method of claim 17, the separate marking module comprising a conventional lithographic marking device.

19. The method of claim 17, the separate marking module comprising another at least one variable data lithography device.

* * * * *